United States Patent
Jalali

(10) Patent No.: US 9,742,484 B2
(45) Date of Patent: Aug. 22, 2017

(54) PROVISION OF BROADBAND ACCESS TO AIRBORNE PLATFORMS AND GROUND TERMINALS USING FIXED SATELLITE SERVICE AND DIRECT BROADCAST SATELLITE SPECTRA

(71) Applicant: Ahmad Jalali, Rancho Santa Fe, CA (US)

(72) Inventor: Ahmad Jalali, Rancho Santa Fe, CA (US)

(73) Assignee: UBIQOMM, INC, San Diego, CA (US)

( * ) Notice: Subject to any disclaimer, the term of this patent is extended or adjusted under 35 U.S.C. 154(b) by 91 days.

(21) Appl. No.: 14/284,079

(22) Filed: May 21, 2014

(65) Prior Publication Data

US 2015/0236780 A1    Aug. 20, 2015

Related U.S. Application Data

(60) Provisional application No. 61/940,805, filed on Feb. 17, 2014, provisional application No. 61/946,575, filed on Feb. 28, 2014.

(51) Int. Cl.
*H04B 7/185* (2006.01)
*H04W 36/30* (2009.01)
(Continued)

(52) U.S. Cl.
CPC ....... *H04B 7/18504* (2013.01); *B64C 39/024* (2013.01); *H04B 7/18506* (2013.01);
(Continued)

(58) Field of Classification Search
CPC combination set(s) only.
See application file for complete search history.

(56) References Cited

U.S. PATENT DOCUMENTS 4,455,651 A * 6/1984 Baran .................... H04B 7/216
                                                        342/352
4,879,711 A   11/1989 Rosen
(Continued)

FOREIGN PATENT DOCUMENTS

IT    EP 2447929 B1 * 10/2010    ............. H04B 7/185
IT    EP 2447929 B1 *  2/2012    ............. H04B 7/185

OTHER PUBLICATIONS

Mohorcic et al. Broadband Communications from Aerial Platform Networks. Research Paper.—Y 2004 [retrieved on Apr. 20, 2015]. Retrieved from the internet: <URL: 2-10 http://www.researchgate.net/profile/Mihael_Mohorcic/publication/215650814 Broadband_Communicationsfrom_Aerial_Platform_Networks/links/09e41510815e28b01b000000.pdf> entire document.

*Primary Examiner* — Ankur Jain
*Assistant Examiner* — Zhitong Chen
(74) *Attorney, Agent, or Firm* — Thomas D. Foster; Bruce Hare

(57) ABSTRACT

Systems and methods are described that use the downlink and uplink frequency bands of the fixed satellite service (FSS) and direct broadcast service (DBS) systems to provide broadband access to aerial platforms including aircraft, drones, and unmanned aerial vehicles (UAVs) such as balloons. The secondary service aerial platform transmitters are configured to avoid interference into the primary satellite service receivers. The aerial platform may be able to detect and connect to the cell site with the strongest signal. The aerial platform may be able to handoff from one cell site to another. Systems and methods are described that provide broadband access to ground terminal via aerial platforms such as drones and UAVs such as balloons.

7 Claims, 13 Drawing Sheets

(51) Int. Cl.
    *B64C 39/02* (2006.01)
    *H04W 84/06* (2009.01)
    *H04W 24/02* (2009.01)
    *H04W 48/16* (2009.01)
    *H04W 88/16* (2009.01)
    *H04W 84/00* (2009.01)

(52) U.S. Cl.
    CPC ..... *H04B 7/18528* (2013.01); *H04B 7/18539* (2013.01); *H04B 7/18543* (2013.01); *H04B 7/18554* (2013.01); *H04B 7/18578* (2013.01); *H04W 36/30* (2013.01); *H04W 84/06* (2013.01); *B64C 2201/122* (2013.01); *H04B 7/18541* (2013.01); *H04W 24/02* (2013.01); *H04W 48/16* (2013.01); *H04W 84/005* (2013.01); *H04W 88/16* (2013.01); *Y02B 60/50* (2013.01)

(56) References Cited

U.S. PATENT DOCUMENTS

| | | |
|---|---|---|
| 5,642,122 A | 6/1997 | Lockie et al. |
| 5,859,620 A | 1/1999 | Skinner et al. |
| 5,974,317 A | 10/1999 | Djuknic et al. |
| 6,018,659 A | 1/2000 | Ayyagiri et al. |
| 6,061,562 A | 5/2000 | Martin et al. |
| 6,167,036 A | 12/2000 | Beven |
| 6,760,593 B1 * | 7/2004 | Driessen ............ H04W 16/28 455/447 |
| 6,856,803 B1 | 2/2005 | Gross et al. |
| 7,123,919 B1 | 10/2006 | Driessen |
| 2002/0122412 A1 | 9/2002 | Chen et al. |
| 2002/0126042 A1 | 9/2002 | Chang et al. |
| 2004/0147222 A1 | 7/2004 | Walsh et al. |
| 2006/0030311 A1 * | 2/2006 | Cruz ................ H01Q 1/246 455/431 |
| 2006/0223573 A1 | 10/2006 | Jalali |
| 2007/0177549 A1 | 8/2007 | Lo et al. |
| 2008/0001854 A1 | 1/2008 | Hamer et al. |
| 2010/0040120 A1 | 2/2010 | Sharma |
| 2011/0263199 A1 * | 10/2011 | Cruz ............ H04B 7/18506 455/12.1 |
| 2013/0231106 A1 | 9/2013 | Knoblach et al. |
| 2013/0321214 A1 | 12/2013 | Zhou et al. |
| 2014/0139395 A1 * | 5/2014 | Solondz ............ 343/872 |

* cited by examiner

PROVISION OF BROADBAND ACCESS TO AIRBORNE PLATFORMS AND GROUND TERMINALS USING FIXED SATELLITE SERVICE AND DIRECT BROADCAST SATELLITE SPECTRA

CROSS-REFERENCE TO RELATED APPLICATIONS

This application claims priority to U.S. Provisional Patent Application Ser. No. 61/940,805, filed on Feb. 17, 2014, U.S. Provisional Patent Application Ser. No. 61/946,575, filed on Feb. 28, 2014.

BACKGROUND OF THE INVENTION

Many aerial platforms such as airplanes, balloons, blimps, and drones or Unmanned Aerial vehicles (UAVs) may desire broadband access.

The Federal Communications Commission (FCC) has recently issued a Notice of Proposed Rule Making (NPRM) to allow the use of the Ku or 14-14.5 GHz band for the use of an air to ground (ATG) system. The use of the 14-14.5 GHz band for ATG deployment is contingent upon protecting the incumbent satellite services in this band. The ATG cell sites must be designed in such a way as to achieve the low emission limits toward Geo-Stationary satellites that will be imposed by the FCC. The 14 to 14.5 GHz band is primarily used for the uplink of geo-stationary satellite systems.

Another spectrum band that is a candidate for use for ATG applications on a non-interfering basis is the spectrum used for the satellite downlink, such as the 12-12.7 GHz band for the satellite direct broadcast service (DBS), and the 11.7-12.2 GHz used for downlink of fixed satellite service (FSS).

The 11.7-12.2 GHz and 11.2-12.7 GHz bands are available in the Americas, so called region 2. The DBS and FSS bands are also available in other regions in different parts of the Ku (12-18 GHz) band. There is also FSS spectrum available in the C and Ka bands to which the techniques of this disclosure also apply. The Ka band downlink and uplink FSS spectrum are in the 18-20 GHz and 26.5-40 GHz ranges, respectively. The exact location of the downlink and uplink in the specified range depends on the specific region of the world. The C band downlink and uplink are in the 3.7-4.2 GHz and 5.925-6.425 GHz range.

Thus there is a need for a system that utilizes the downlink and uplink of the FSS and DBS bands to provide Internet connectivity to aerial platform terminals as well as ground terminals, without interfering with the incumbent satellite receivers/services.

BRIEF SUMMARY OF THE INVENTION

The present disclosure describes aspects of a system for providing broadband Internet access to aerial platforms such as airplanes, balloons, blimps, and drones or unmanned aerial vehicles (UAVs) using fixed satellite service (FSS) and direct broadcast satellite (DBS) spectra as a secondary service.

Some embodiments provide systems and methods for providing broadband access to aerial platforms. A system may include: an aerial platform consisting of a radio transmitter sub-system, a radio receiver sub-system, a processor sub-system, a memory sub-system, and an antenna sub-system. A coverage area of the system may be divided into cell sites with cell site radio equipment consisting of a processor sub-system, a memory sub-system, an antenna sub-system, and a terrestrial Internet connectivity sub-system placed at the upper and lower corner of each cell site. The system may also include a wireless radio transmitter sub-system at the first corner of the cell site (the upper or lower), and a wireless radio receiver at the second, remaining, corner of the cell site.

Some embodiments provide systems and methods to ensure all wireless radio transmissions between an aerial platform and cell site equipment are in one direction, north to south, or vice versa depending on whether the system is deployed in the northern hemisphere or southern hemisphere, by having the aerial platform receive data from the radio antenna sub-system located at the first corner of the cell site only, and transmit data only to the radio sub-system of the second corner of the cell site.

Some embodiments provide systems and methods for connecting the cell site equipment at the first and second corners of each site as well as adjacent cell sites via a terrestrial network or a second wireless network operating on possibly a second frequency other than the one used for communications with the aerial platforms; for the cell site radio sub-system located at the first corner of the cell site to send signaling messages to the aerial platform; and for the radio sub-system located at the second corner of the cell site to receive signaling messages from the aerial platform and forwarding the signaling messages to the cell site equipment at the first corner of the same cell site.

Some embodiments provide systems and methods for an aerial platform transmit antenna to reduce its transmit antenna gain at shorter distances to the receiving cell site in order to keep an almost constant sum of path loss plus transmit antenna gain regardless of distance between the aerial platform and receiving cell site antenna. The cell site transmit antenna also includes systems and methods to reduce its transmit antenna gain at shorter distances to the aerial platform in order to keep an almost constant sum of path loss plus transmit antenna gain regardless of distance between the aerial platform and the transmitting cell site antenna.

Some embodiments provide systems and methods that allow an aerial platform radio sub-system to measure beacon signals received from the nearby cell site transmitters located at the first corner of the cell sites; the aerial platform to send an association/connection request message to the receiver radio sub-system located at the second corner of the cell site from which it receives the beacon with strongest signal quality; the receiving cell site radio sub-system at the second corner of the cell site to send an acknowledgement message in response to the association message to the cell site radio sub-system at the first corner of the cell site; and the cell site radio transmitter at the first corner of the cell site to forward the association acknowledgement message to the aerial platform to complete the association/connection.

Some embodiments provide systems and methods that allow the aerial platform radio sub-system receiver to measure downlink signal quality from signals sent from the cell site radio sub-system transmitter located at the first corner of the cell site, and to determine the highest achievable downlink data rate, referred to as downlink data rate indicator (DDRI) based on measured signal quality; the cell site radio sub-system receiver located at the second corner of the cell site to measure signal quality of the signal sent by the aerial platform on the uplink, and to determine the highest achievable uplink data rate, referred to as uplink data rate indicator (UDRI) based on measured signal quality; the cell site equipment at the second corner of the cell site to send the UDRI to the cell equipment at the first corner of the cell site, and the radio sub-system transmitter of the first corner sending the UDRI to the aerial platform; the aerial platform radio sub-system to send the DDRI to the receive radio sub-system at the second corner of the cell site, the cell site equipment at the second corner sending the DDRI to the cell site equipment of the first corner; and the cell site equipment at the first corner to use the DDRI to determine the data rate at which to transmit to the aerial platform.

Some embodiments provide systems and methods to detect the need for handoff from one cell site to another and to carry out handoff whereby: the aerial platform radio sub-system measures beacon signal strength of the cell site radio transmitter located at the first corner of the nearby cell sites; the aerial platform radio or processor sub-systems determine, based on measured beacon signal qualities, if the signal strength of beacon signal of a second cell site is within a certain threshold of beacon signal of the first cell site currently serving the aerial platform, i.e. if handoff to a second cell site is needed; the aerial platform radio sub-system sends a handoff request message to the cell site radio receiver located at the second corner of the first cell site requesting handoff to a second cell site; and the cell site equipment located at the second corner of the first, serving, cell site forwards the handoff request message to the cell site equipment located at the first corner of the first cell site as well as to the second cell site to which the aerial platform has requested handoff to complete the handoff process.

In some embodiments, the radio sub-system at the first corner of the cell site includes a radio receiver, and the radio sub-system at the second corner of the cell site includes a radio transmitter. In an embodiment of the system where the cell site equipment at both corners of the cell site include both radio transmitter and receivers: the aerial platform transmits on the FSS uplink frequency and receives on the FSS downlink frequency to/from the cell site equipment at the first corner of the cell site; the aerial platform transmits on the FSS downlink frequency and receives on the FSS uplink frequency to/from the cell site equipment at the second corner of the cell site; and the cell site equipment at one corner of the cell site is identified as the anchor to the Internet, and the data from the cell site equipment at the other corner is sent to the anchor corner to reach the Internet.

In another embodiment, only the southern corner of the cell site has radio and antenna sub-system equipment, and the aerial platform radio sub-system transmits on the FSS downlink frequency to the cell site radio sub-system at the southern corner, and the cell site radio sub-system at the southern corner transmits to the aerial platform using the FSS uplink frequency.

Some embodiments provide systems and methods to provide Internet access to ground terminals using aerial platforms. Ground terminals consist of: a processor sub-system; a memory sub-system; a radio transmitter to encode data and modulate signals and transmit to aerial platforms using one or more of the FSS downlink frequency bands; a radio receiver unit to demodulate and decode signals received from aerial platforms on one of the FSS downlink frequency bands; and at least one antenna fixture tuned to one or more FSS downlink pointed toward at least one aerial platform.

In some embodiments, the ground terminal processor and radio sub-system control one antenna to point to an aerial platform to its north direction and control the second antenna to point to a second aerial platform to the south of the ground terminal. Furthermore, the ground terminals transmit on an FSS downlink frequency band to the aerial platform to its north or south depending on whether the ground terminal is located in the northern hemisphere or southern hemisphere, and the receive from the second aerial platform on an FSS downlink frequency band.

In some embodiments, the ground terminals transmit on one or more FSS uplink frequency band to one of the two aerial platforms to the north of the terminal for terminals deployed in the northern hemisphere, or to the aerial platform to the south of the terminal for terminals deployed in the southern hemisphere; and the ground terminals receive on one or more FSS uplink frequency bands from one or both of the aerial platform to its north or south. In another aspect of the disclosure, the ground terminals only communicate with one of the two aerial platforms to its north or south.

In some embodiments, the ground terminal radio sub-system further reduces the transmit power spectral density by spreading and encoding the data to be transmitted over a wider bandwidth than the data rate. Furthermore, the ground terminal radio sub-system uses a terminal specific code to encode the terminal data to be transmitted so that the aerial platform radio sub-system may separate and decode the signals received from different ground terminals on the same frequency.

The preceding Brief Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide ways to share the spectrum of downlink and uplink of FSS and DBS bands in the C, Ku and Ka bands to provide Internet connectivity to aerial platforms as well as to ground terminals, without interfering with incumbent satellite services. Some embodiments may use the downlink of the satellite FSS and DBS bands to provide Internet connectivity to aerial platforms on a non-interfering basis. The uplink spectrum of the FSS bands in conjunction with the downlink spectrum may be used by some embodiments to provide Internet connectivity to aerial platforms. Some embodiments may provide Internet connectivity to ground terminals using the FSS and DBS bands while using aerial platforms as a relay.

Figure 1:
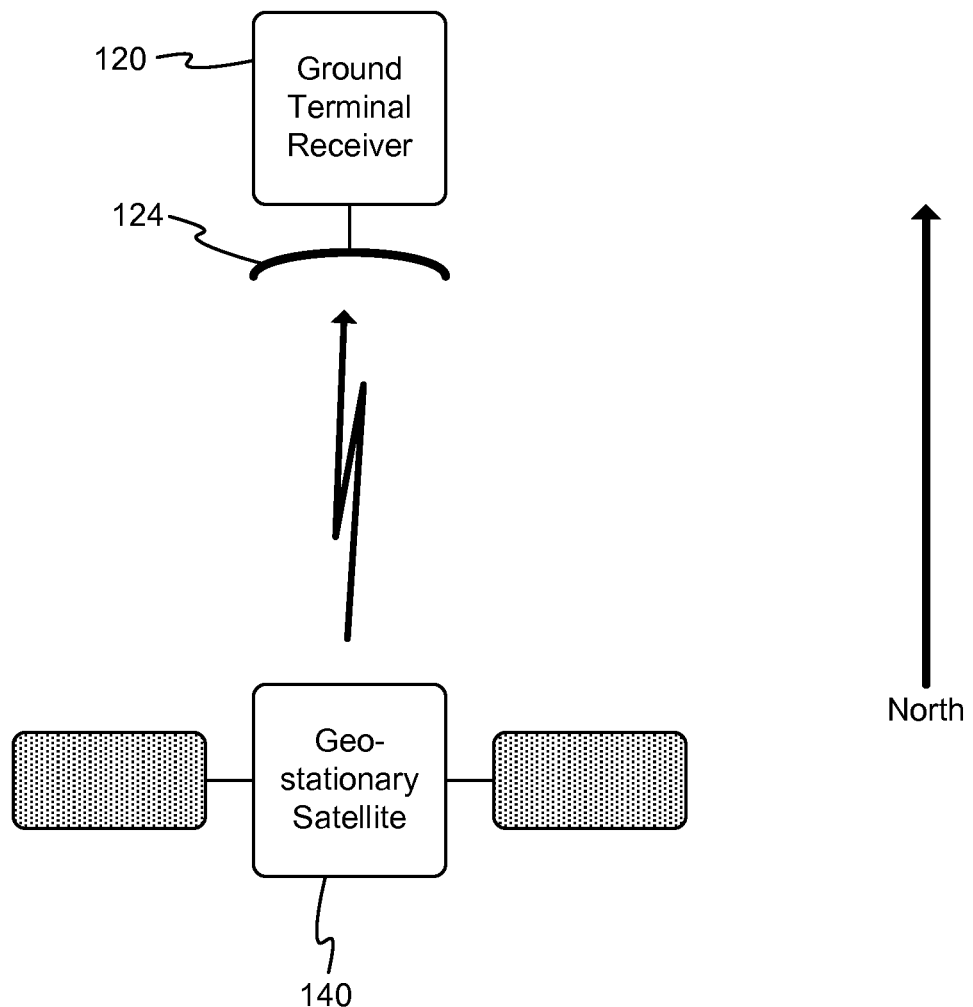
FIG. 1 illustrates a schematic block diagram of a direct broadcast satellite service system of some embodiments.

FIG. 1 shows a ground terminal satellite receiver 120 and a geo-stationary satellite 140. Consider a satellite terminal 120 that is located in northern hemisphere, such as over the continental United States (CONUS). The terminal antenna 124 is pointing southward toward satellite 140. Satellite 140 is transmitting information to terminals in the general northern direction. The terminal antenna 124 receiving signals from the satellite has a high gain antenna pointing toward the satellite and a low gain "backlobe" antenna pointing toward north. Therefore, any secondary service that uses the spectrum used for geo-stationary satellite FSS or DBS downlinks (such as the 12.2-12.7 or 11.7-12.2 GHz of the Ku bands in the US or similar bands in other regions of the world) must avoid transmitting toward the main antenna lobe of the satellite terminal antenna 124. There are also other satellite FSS bands (e.g., the Ka and C bands) to which embodiments of this invention may apply.

To avoid interference, the transmissions of the secondary service should occur toward the southern direction in order to avoid transmitting into the main lobe of the satellite terminal antenna. Moreover, the signal of the secondary service received at the backlobe of the primary service satellite receiver 120 must be low enough such as not to increase the thermal noise of the satellite receiver by more than a certain threshold (e.g., the rise over thermal (ROT) caused by the secondary service must be held below a threshold). The ROT limit allowed for secondary services is typically 1% or less. For terminals placed in the southern hemisphere, the satellite antennas would point toward north and any secondary service deployed in the southern hemisphere would need to avoid transmitting toward south.

In general, the secondary service needs to limit transmission to the back of the satellite terminal antennas in order to avoid interfering with the satellite service. The systems and methods described herein may utilize an exemplary system deployed in the northern hemisphere. The systems and methods are the same for a system deployed in the southern hemisphere, but by directions of transmissions would be reversed.

Figure 2:
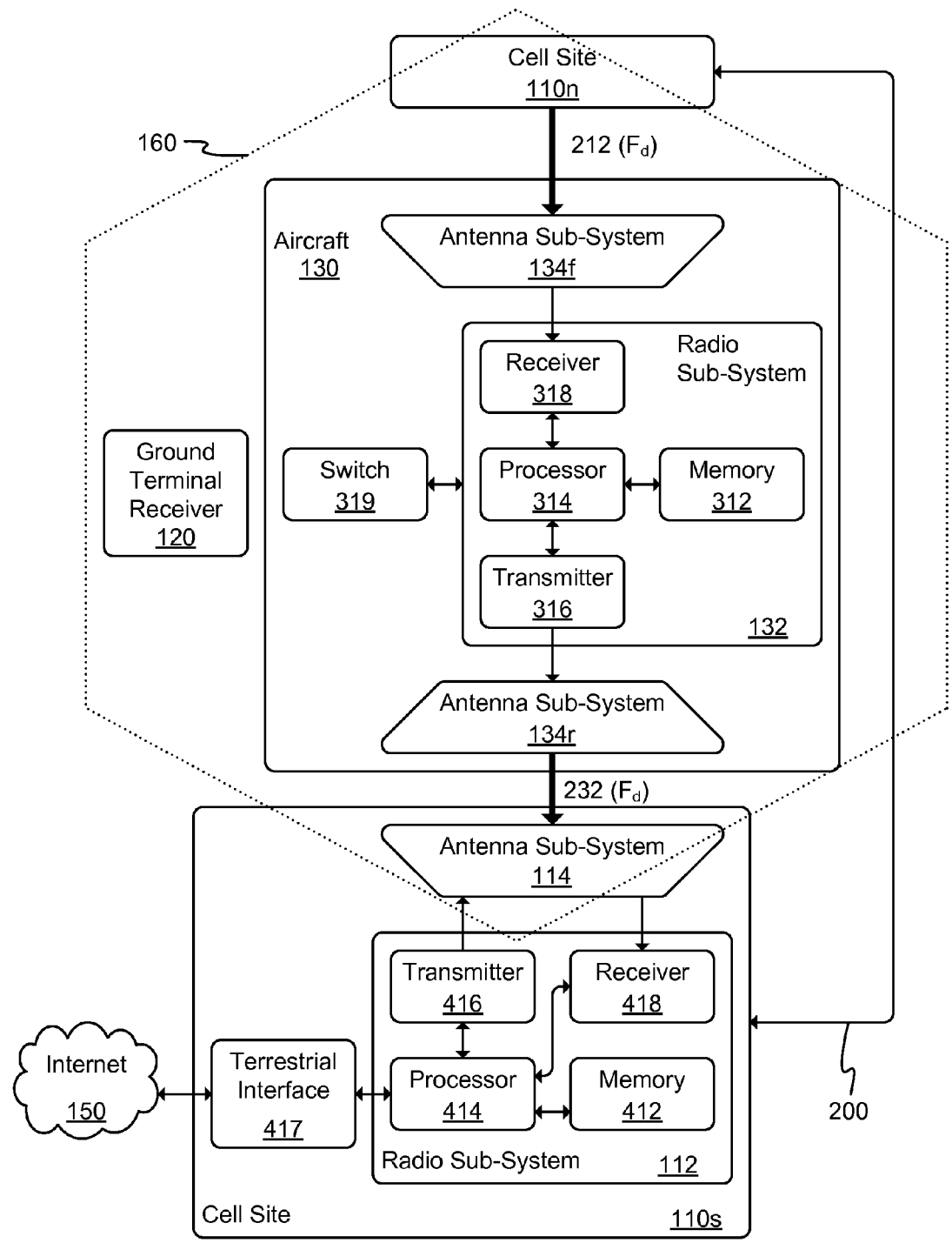
FIG. 2 illustrates a schematic block diagram showing a system of some embodiments for providing broadband access to an aerial platform using the downlink spectrum of FSS or DBS frequency bands.

Some embodiments may provide Internet connectivity to aerial platforms such as aircraft or drones using a network of ground cell sites. FIG. 2 shows a hexagonal cell site coverage area 160, a cell site 110s (with associated cell site radio sub-system 112) deployed at the southern corner of the area 160, and cell site 110n (with associated cell site radio sub-system 112, not shown) deployed at the northern corner of area 160. In some embodiments, the two sites 110s-110n may together form a single cell site 110 with associated hexagonal coverage area 160. As will be described in detail below, the cell sites 110s and 110n may communicate with aerial platforms 130, via radio sub-systems 112, in such a way as not to interfere with satellite terminals 120.

The cell site radio sub-system 112 may include a memory sub-system 412, a processor sub-system 414, a transmitter sub-system 416 to modulate data and transmit the signal toward aerial platform, a receiver sub-system 418, and a terrestrial connectivity sub-system 417 to send and receive data from the Internet. In some embodiments, the radio sub-system 112 of the site 110n deployed at the northern corner of area 160 may include a transmitter sub-system 416 but not a receiver sub-system 418 and the site 110s deployed at the southern corner may include a receiver 418 but not a transmitter 416.

The airborne platform may be an aircraft, a drone/UAV (Unmanned Aerial Vehicle), helicopter, balloon, blimp, robocopter, high altitude platforms, and/or any other device that may be able to fly and/or hover from low to high altitude (e.g., up to seventy thousand feet or more). As shown in FIG. 2, the aerial platform 130 has an aerial platform antenna sub-system 134 and an aerial platform radio sub-system 132 connected to the antenna sub-system 134.

As shown, the aerial platform radio sub-system 132 may include a transmitter 316 for modulating the data and sending a signal through the antenna fixture 134, a receiver 318 for demodulating and decoding the cell site signal received on antenna fixture 134, a processor 314 for functions such as controlling the transmitter and receiver, doing handoffs, and determining what data to send to the cell sites among other functions, memory sub-system 312 for storing program code, configuration data and system parameters, and switch sub-system 319 for switching data received from different ground terminals to cell sites and vice versa.

The aerial platform antenna 134 must have coverage in 360° in order to have visibility to at least two cell sites, one to the north and one to the south. As shown in FIG. 2, one way to ensure that the aerial platform antenna sub-system 134 views at least two cell sites is to install two antenna fixtures 134r and 134f in order to avoid any blockage due to engine pod, wings, and/or other features. Each of the aerial platform antennas 134f and 134r must cover at least 180° in azimuth in order to ensure that regardless of the orientation of the aerial platform at least one antenna has visibility to cell site antennas 114n and 114s.

Each of the aerial platform antennas 134f and 134r may include a number of antenna apertures. As shown in FIG. 2, the cell site radio sub-systems and aerial platform radio sub-system may communicate over an FSS downlink frequency denoted by $F_d$. If both downlink and uplink FSS frequency bands are used, transmissions are shown using $F_d$ and $F_u$ labels.

Figure 3:
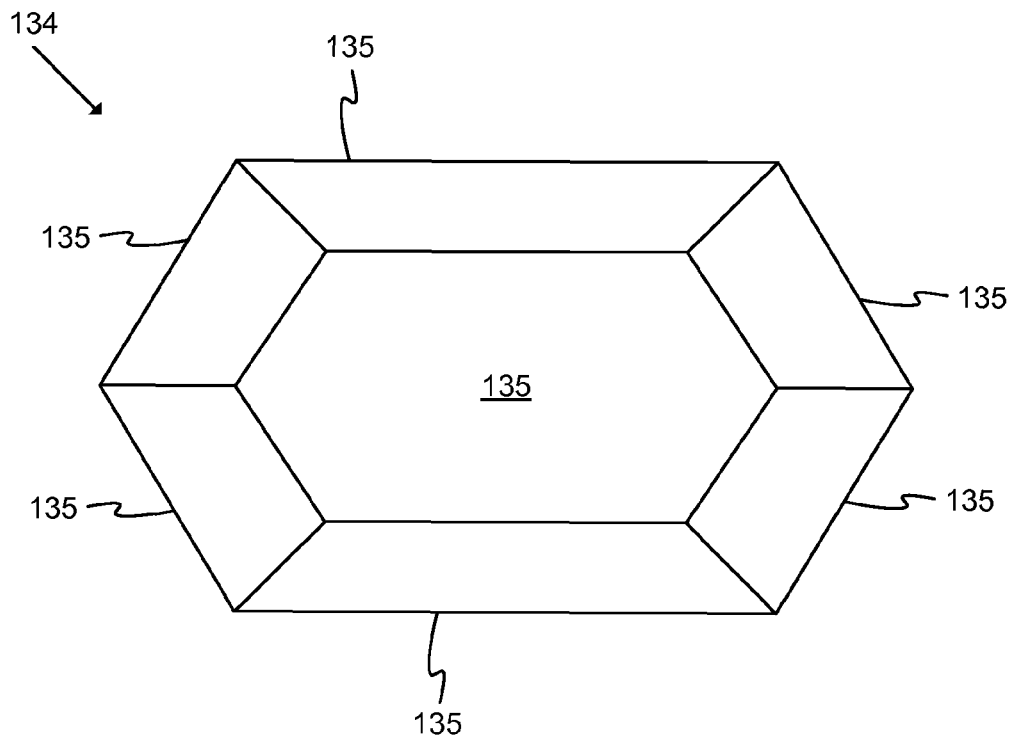
FIG. 3 illustrates a conceptual representation of an antenna structure used by some embodiments.

FIG. 3 shows one example aerial platform antenna 134 structure that has seven apertures 135 and covers 360° in azimuth as well as low and high elevation angles. Each antenna aperture may include a number of antenna elements. Antenna elements may be combined appropriately, such as using phased array technology, to steer the antenna beam in azimuth and elevation toward the desired location. If an antenna with multiple antenna apertures such as the one in FIG. 3 is used in the aerial platform, then one of the apertures may be used to receive from cell site antenna 114n and a second aperture may be used to transmit toward cell site antenna 114s.

Figure 4:
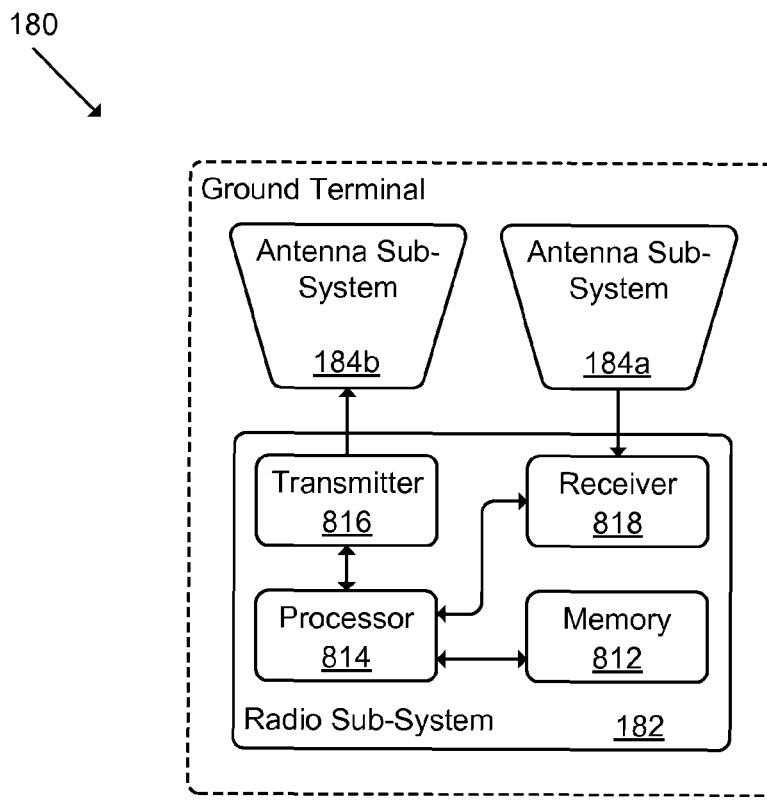
FIG. 4 illustrates a schematic block diagram of the ground terminal radio equipment of some embodiments.

FIG. 4 shows a schematic block diagram of a ground terminal 180. Ground terminal radio sub-system 182 may include a processor sub-system 814, a memory sub-system 812, a transmitter sub-system 816, and a receiver sub-system 818. The system of FIG. 4 also includes two different antennas 184a and 184b for the ground terminals. As described in further detail below, in some embodiments one antenna is used to receive from an aerial platform from north of the ground terminals and the other antenna is used to transmit to an aerial platform to the south of the ground terminal or vice versa.

In the description that follows, secondary service may refer to the service provided from/to the aerial platforms. In order to avoid transmitting toward the main lobe of the ground terminal satellite antennas, all transmissions must only be toward south. FIG. 2 illustrates the flow of traffic between the aerial platform 130 and cell site radio sub-systems 112n and 112s. Data destined from the Internet 150 to aerial platform 130 may be sent to the aerial platform using cell site radio sub-system 112n. Antenna aperture 114n of cell site 112n may be used to transmit messages/data packets 212 to aerial platform 130 to the south of the cell site 112n. Then, the signal transmitted by 112n may be seen by the backlobe of satellite terminal antenna 124, thereby avoiding interference into the satellite terminal 120.

Messages/data packets 232 from aerial platform 130 may be sent to cell site 110s. Cell site antenna aperture 114s of cell site 110s may be used only to receive from aerial platform 130 as shown in FIG. 2. In other words, aerial platform 130 may receive data from cell site 110n and transmit data to cell site 110s. In this fashion, all transmissions to and from aerial platform 130 are toward the southward direction thereby avoiding transmission into the main lobe of satellite antennas 124 which are also directed toward the south direction.

The interference caused at the satellite terminal receiver by the secondary service aerial platform 130 transmitter is given by equation (1) below:

$$\text{Interference (dBW)} = \text{Aerial\_Platform\_PA\_Power (dBW)} + \\ \text{Aerial\_Platform\_Antenna\_Gain\_Toward\_Satellite\_Terminal (dB)} - \\ \text{Path\_Loss (dB)} + \\ \text{Satellite\_Receiver\_Antenna\_Backlobe\_Gain (dB)}. \quad (1)$$

Assume the worst case backlobe gain for the satellite terminal antenna for interference calculation of equation (1) above (i.e., assume the satellite terminal antenna backlobe gain is constant). Then, as can be seen from equation (1), in order to maintain interference from the secondary service transmitter into the satellite terminal receiver below a certain threshold, the sum of path loss from the secondary transmitter to the satellite terminal receiver and the Effective Isotropic Radiated Power (EIRP) from the secondary transmitter toward the satellite terminal receiver must be below a threshold regardless of the relative locations of the secondary service transmitter and the satellite terminal receiver. Note that the sum of the first two terms on the right hand side of (1) (i.e., the PA transmit power and the transmit antenna gain) determine the EIRP in a given direction. The condition that the received signal power from a secondary service at the primary service satellite terminal be almost constant regardless of the distance between the secondary service transmitter and the primary service satellite terminal receiver is referred to as the "isoflux" property in this document.

Figure 5:
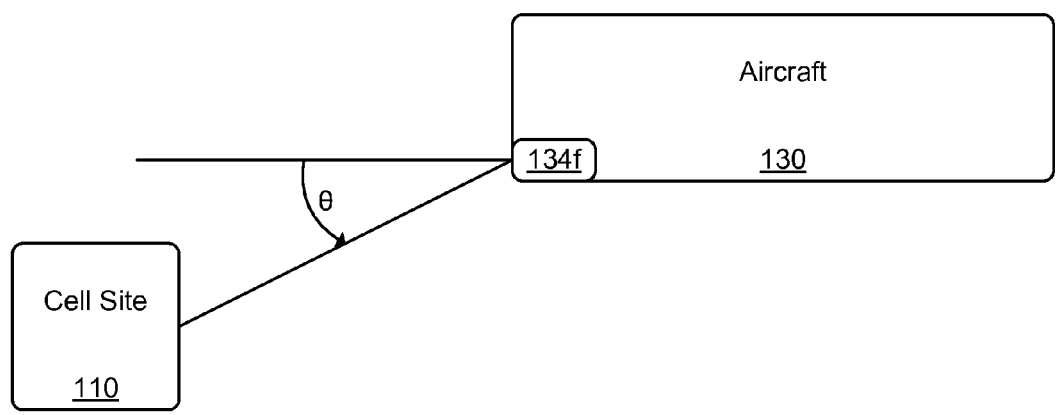
FIG. 5 illustrates a schematic block diagram showing the angle between an aerial platform transmission and a cell site.

FIG. 5 shows the angle θ from the main beam of the airborne platform antenna 134f toward a cell site 110 or terminal on the ground relative to the horizon direction. When the aerial platform 130 is very far from the cell site 110, then the main beam of the aerial platform antenna 134f points just below the horizon toward the cell site 110. Therefore, the highest aerial platform antenna gain is a few degrees below horizon to cover the most distance cell site. For given aerial platform and cell site locations, the closer the satellite terminal is to the airborne platform the larger the angle θ. Therefore, the antenna gain of the airborne transmitter must have low gain at high angles θ, so that the sum of the EIRP from the airborne transmitter and the path loss toward the terminal on the ground remain almost constant. In other words, the gain from the airborne transmit antenna must decrease as the angle θ increases commensurate with the decrease in path loss. Note that if the aerial platform is close to the cell site, then the aerial platform antenna gain toward the cell site will be low. But since the path loss from the aerial platform to a near cell site is also small due to the small distance, the signal received from the aerial platform at the cell site will be high enough to achieve the required the data rates.

Figure 6:
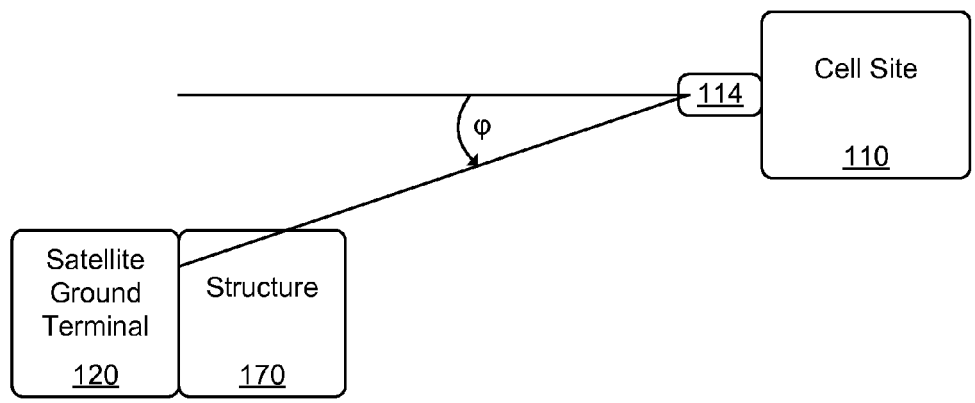
FIG. 6 illustrates a schematic block diagram showing the angle between a ground terminal and cell site.

As shown in FIG. 6, the primary service satellite terminal 120 may typically be located on the side of a house or building 170, pointed south. The cell site antenna 114 may typically be located at the top of a tower high enough so that the angle φ will be as high as possible. For terminals that are farther away from cell site 110n, the angle φ decreases but the path loss increases. The interference received at the satellite receiver from the secondary service is given by equation (2) below:

$$\text{Interference (dBW)} = \text{Cell\_Site\_PA\_Power (dBW)} + \quad (2)$$
$$\text{Cell\_Site\_Antenna\_Gain\_Toward\_Satellite\_Terminal (dB)} -$$
$$\text{Path\_Loss\_dB} - \text{House\_Penetration\_Loss (dB)} +$$
$$\text{Satellite\_Receiver\_Antenna\_Backlobe\_Gain (dB)}.$$

One approach to maintain low interference into the satellite receiver would be to design the cell site antenna 114 so that the gain of the antenna below horizon is low. At closer distances to the cell site 110, the angle φ is high and the cell site antenna roll off would be high helping maintain interference into the satellite receiver below the threshold. At farther distances, the angle φ would be lower and the cell site antenna gain toward the satellite receiver would be higher; but the path loss between the cell site and the satellite receiver would also be higher helping contain interference. Moreover, at farther distances from the cell site it is very likely that there will be obstructions such as trees and buildings which would significantly attenuate the signal from the cell site toward the satellite receiver. In fact, if the secondary service cell site antenna is on top of a tower and the satellite receiver on the south side of a house/building then even at close distances between the cell site and satellite terminal there may be significant house/building penetration loss reducing interference into the satellite receiver.

FIG. 2 shows a communication pathway 200 among radio sub-systems 112*n* and 112*s*. The pathway 200 depicts a terrestrial communication path for carrying necessary signaling messages as well as data packets between 112*n* and 112*s* which will be further described below. The pathway 200 may be implemented via a dedicated physical wired or fiber link, dedicated virtual links, microwave links, satellite links, and/or other appropriate communication pathways.

Messages 212 originating from cell site 110*n*, may be signaling messages such as a beacon signal periodically sent by the cell site, or data packets received from the Internet 150. Messages 232 sent by aerial platform 130 to cell site 110*s* may similarly be signaling messages such as association/registration, handoff initiation, uplink bandwidth request, or data packets destined from aerial platform 130 to the Internet 150.

As was described above, the downlink (direction from ground cell site to aerial platform) and the uplink (direction from aerial platform to the ground cell site) transmissions occur from geometrically distant cell sites 110*n* and 110*s*. Therefore, a signaling mechanism is needed between cell site equipment 110*n* and 110*s* in order to carry out radio link management functions such as controlling data rates on the downlink and uplink, acknowledging the downlink and uplink packets, and carrying out handoffs from one cell site area 160 to another.

Each cell site radio sub-system 112*n* may periodically transmit a beacon signal 212. The aerial platform 130 may search for beacon signals. In searching for the beacon signals, the aerial platform radio sub-system 132 may use the aerial platform position location coordinates and knowledge of cell sites in view of the aerial platform to limit the search to those beacons that are more likely to be in view of the aerial platform antenna 134. Aerial platform radio sub-system 132 may decode the beacon signals 212 received from all cell sites 110*n* from which it can receive a strong enough signal, and choose the cell site 110*n* from which it receives the strongest beacon signal.

Aerial platform radio sub-system 132 may then send an association request in a message 232 to the chosen cell site radio sub-system 112*s*. The cell site radio sub-system may, in turn, send the association message to cell site 112*n* so that cell site 112*n* may send an acknowledgement of the association request in a message 212 to aerial platform 130. At this time, aerial platform 130 may be associated with cell sites 110*n* and 110*s*, where site 110*n* provides the downlink to the aerial platform 130 and site 110*s* provides the uplink to the aerial platform 130.

The association message may be a request to set up a connection between the aerial platform 130 and the cell sites 110*n* and 110*s*. The connection may be set up when the aerial platform receives an acknowledgement message for the association message.

Figure 7A:
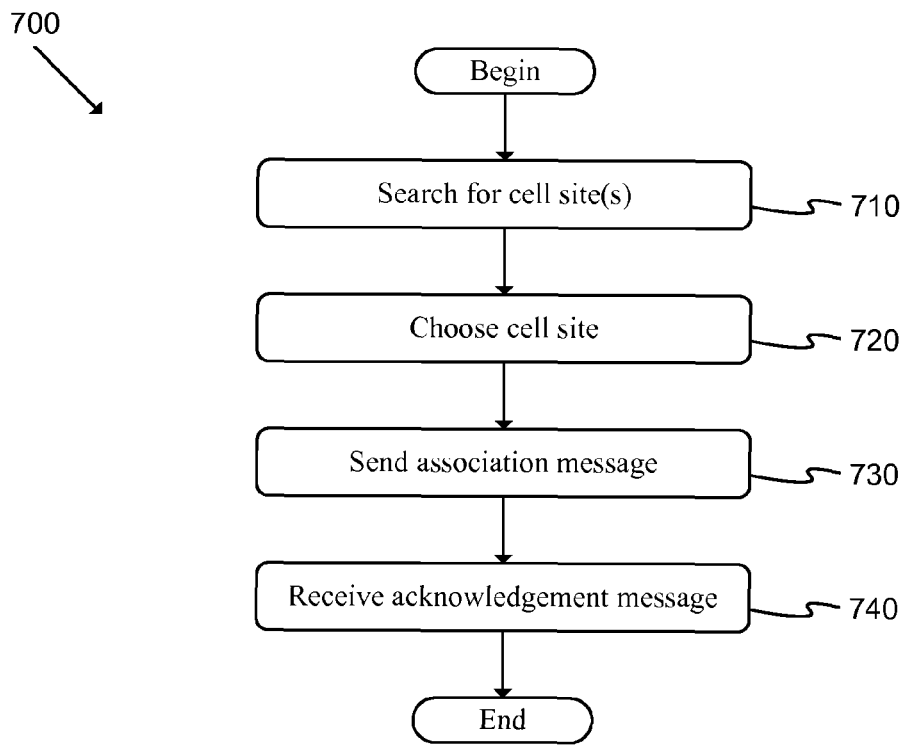
FIG. 7A illustrates a flow chart of a conceptual process used by an aerial platform to detect a cell site beacon and to establish a connection with the cell site.

FIG. 7A illustrates a flow chart of a conceptual process 700 used by an aerial platform to detect a cell site beacon and to establish a connection with the cell site. The process may be performed by an aerial platform radio sub-system of some embodiments.

As shown, the process may search (at 710) for all cell site beacons sent from cell site radio sub-systems from north of the aerial platform. Next, the process may choose (at 720) the cell site from which it receives the strongest beacon (or choose a cell site based on some other appropriate criteria). The process may then send (at 730) an association message to the cell site radio sub system that is to the south of the aerial platform and is paired with the northern cell site chosen at 720. The process may then receive (at 740) an acknowledgement message from the northern cell site of the chosen north-south pair. With a communication link established, the process may then end.

Figure 7B:
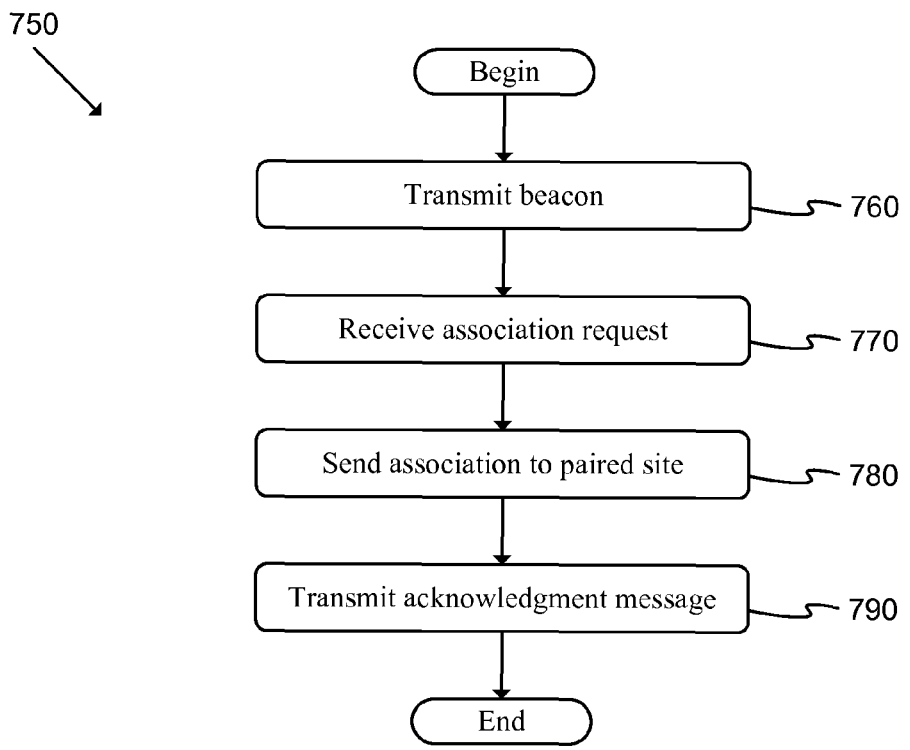
FIG. 7B illustrates a flow chart of a conceptual process a cell site may perform to establish a connection with an aerial platform.

FIG. 7B illustrates a flow chart of a conceptual process 750 a cell site may perform to establish a connection with an aerial platform. Such a process may be performed by the cell site radio sub-systems of the north-south pair.

As shown, the process may transmit (at 760) a beacon signal. Such a signal may be constantly transmitted while the site is operating. The beacon signal may be sent by the north site in a north-south pair. Next, the process may receive (at 770) an association request from an aerial platform. Such an association request may be received by the south site in a north-south pair. Next, the process may send (at 780) an association message from the south site to the north site (e.g., over link 200). The north site may then transmit (at 790) an acknowledgement message to the aerial platform to establish a communication link and then the process may end.

Some embodiments provide a way to acknowledge uplink and downlink packets. In any wireless communication system, each end of the link needs to detect the packets that have not been received correctly so that the transmitter may resend the erroneous packets. The uplink receiver at cell site 110*s* may determine which packets are missing (i.e., packets that have not been received correctly from the aerial platform) and send a message to the downlink transmitter at cell site 110*n* with information regarding any missing packets. Cell site transmitter 112*n* may, in turn, send a message on the downlink to aerial platform 130 with the list of packets that the cell site 110*s* receiver is still expecting from the aerial platform 130. Aerial platform 130 radio sub-system 132 may then retransmit the missing packets to cell site 110*s*. Aerial platform radio sub-system 132 may detect the missing downlink packets and send a message to cell site 110*s* with the list of missing packets. Cell site 110*s* may, in turn, send a message to cell site 110*n* with information regarding any missing packets. Cell site radio sub-system 112*n* may then retransmit the missing packets to the aerial platform 130.

The aerial platform radio sub-system 132 may need to choose highest data rate at which to send messages/data packets to cell site 110*s* such that the cell site radio system 112*s* may decode be able to decode the received data correctly with a high probability. The cell site radio sub-system 112*s* may measure signal quality metrics such as signal to interference plus noise ratio (SINR) using the messages sent by aerial platform radio sub-system 132. The cell site radio sub-system 112*s* may then determine the highest data rate that it can decode using the measured signal quality, referred to as the uplink data rate index (UDRI), and send the UDRI to cell site radio sub-system 112*n*. Cell site 110*n* in turn may send the UDRI in a message 212 to aerial platform radio sub-system 132. The aerial platform radio sub-system may then use the UDRI to choose the data rate to send information to cell site 110*s*.

Similarly, the aerial platform radio sub-system 132 may measure a signal quality metric such as SINR using packets 212 it receives from the cell site radio sub-system 112*n*. The sub-system 132 may then determine the highest data rate the sub-system may decode given the measured signal quality, referred to as the downlink data rate index (DDRI). Aerial platform radio sub-system 132 may send the determined DDRI to cell site radio sub-system 112*s*. Radio sub-system 112*s* in turn may send the DDRI to cell site radio sub-system 112*n* using a terrestrial communications network 200. Cell site radio sub-system 112*n* in turn may use the received DDRI to choose the data rate it uses to send information to aerial platform 130.

Figure 8A:
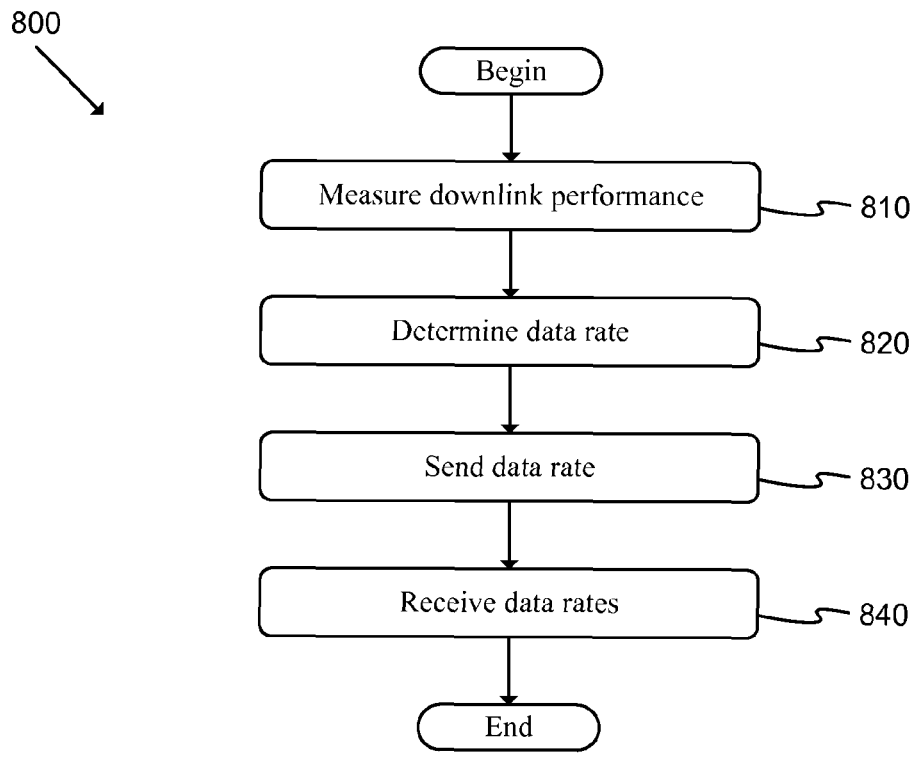
FIG. 8A illustrates a flow chart of a conceptual process used by some embodiments to determine the data rates the aerial platform and cell site radio sub-systems use to transmit data.

FIG. 8A illustrates a flow chart of a conceptual process 800 used by some embodiments to determine the data rates the aerial platform and cell site radio sub-systems use to transmit data. Such a process may be executed by an aerial platform of some embodiments.

As shown, the process may measure (at 810) downlink performance and determine (at 820) a data rate. The aerial platform may measure received SINR on the downlink and uplink data rates (DDRI and UDRI) using received messages or beacon/pilot signals. Next, the process may send (at 830) the determined DDRI to the southern cell site 110*s*. The process may then receive (at 840) determined data rates from the northern cell site 110*n* and then may end. The northern cell site and the aerial platform radio sub-system 132 may then transmit data at the DDRI and UDRI data rates.

Figure 8B:
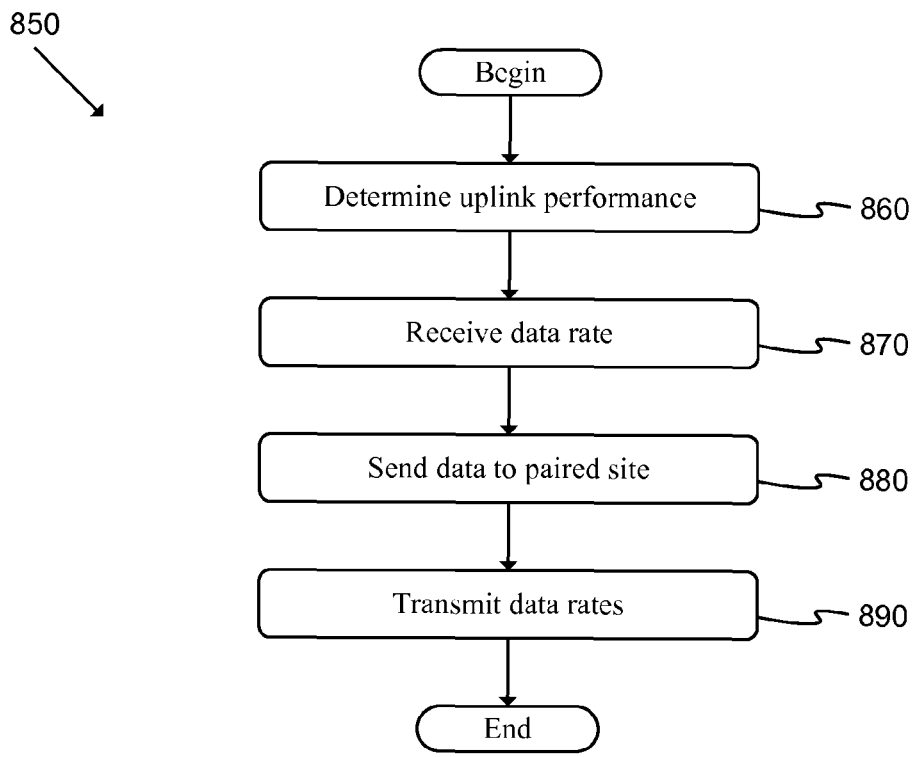
FIG. 8B illustrates a flow chart of a conceptual process used by some embodiments to determine the data rates the aerial platform and cell site radio sub-systems use to transmit data.

FIG. 8B illustrates a flow chart of a conceptual process 850 used by some embodiments to determine the data rates the aerial platform and cell site radio sub-systems use to transmit data. Such a process may be executed by a cell site pair of some embodiments.

As shown, the process may determine (at 860) uplink performance using received messages or beacon/pilot signals. Next, the process may receive (at 870) a data rate (e.g., determined DDRI) from the aerial platform. The process may then send (at 880) the received and determined data rates to the northern cell site 110*n* from the southern cell site 110*s* using a terrestrial link 200. The process may then send (at 890) the data rates to the aerial platform from the northern cell site 110*n*. The northern cell site and the aerial platform radio sub-system 132 may then transmit data at the DDRI and UDRI data rates.

Figure 9:
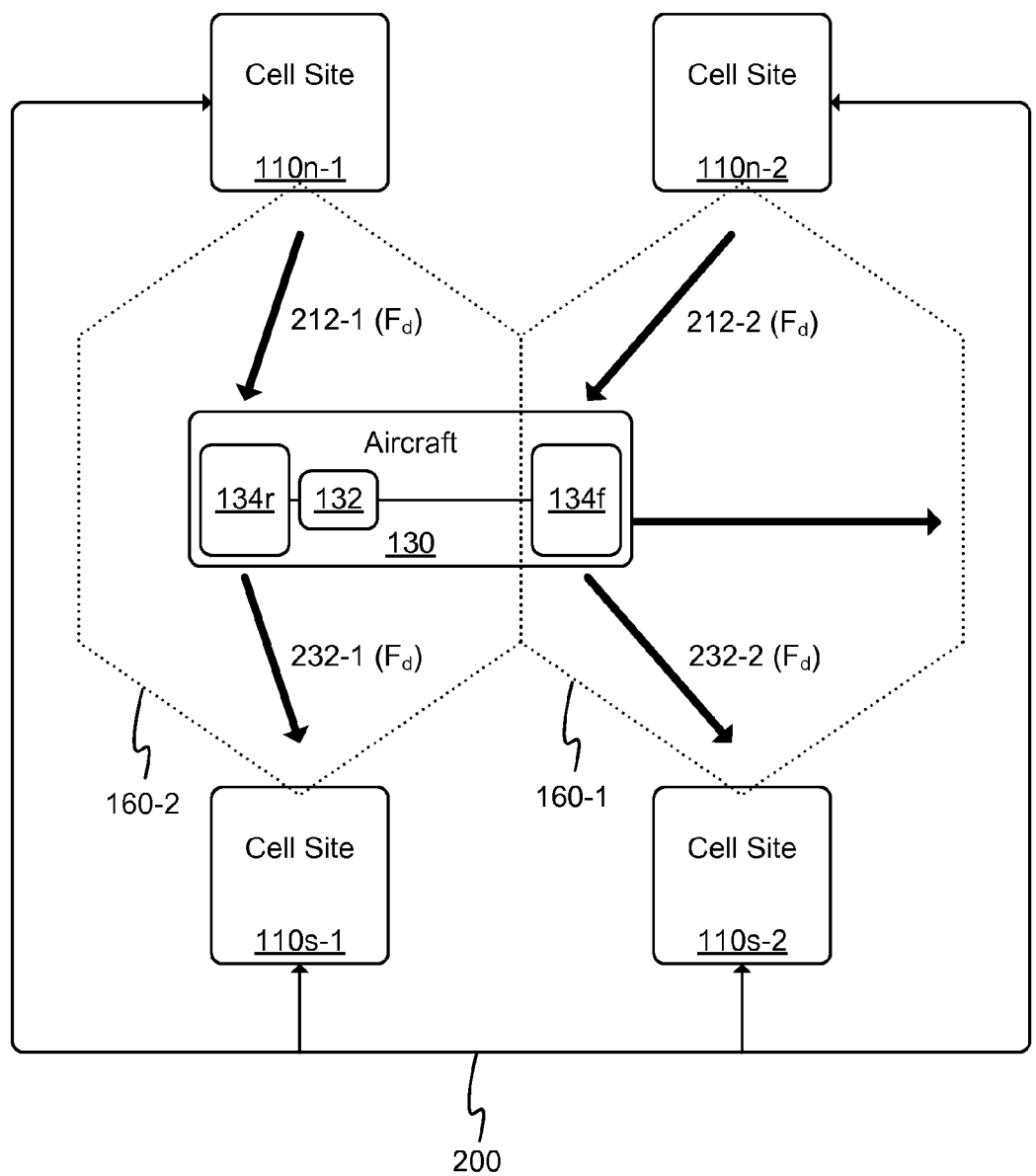
FIG. 9 illustrates a schematic block diagram showing handoff of an aerial platform from one cell site to another.

FIG. 9 illustrates a schematic block diagram of an aerial platform handoff from a first cell site 110-1 having associated coverage area 160-1 to a second cell site 110-2 having associated coverage area 160-2. The aerial platform radio sub-system may measure beacon signals received from neighboring cell sites 110-1 and 110-2. Once the aerial platform radio sub-system finds a beacon signal that is within a certain threshold of the beacon of the cell site it is communicating with, it may send a handoff request within a message 232-1 to the southern cell site radio sub-system 112*s*-1.

Cell site 110-1 may send a message to cell site 110-2 informing cell site 110-2 that the aerial platform 130 intends to handoff to cell site 110-2, and will also specify a time after which aerial platform 130 will start communication with cell site 110-2. Cell site radio sub-system 112*s*-1 may also send a message to radio sub-system 112*n*-1 informing the northern cell site 110*n*-1 that the aerial platform 130 will handoff to cell site 110-2 after a certain time instant. Cell site radio sub-system 112*n*-1 in turn may send an acknowledgement for the handoff to the aerial radio sub-system 132 using a downlink message 212-1.

Figure 10A:
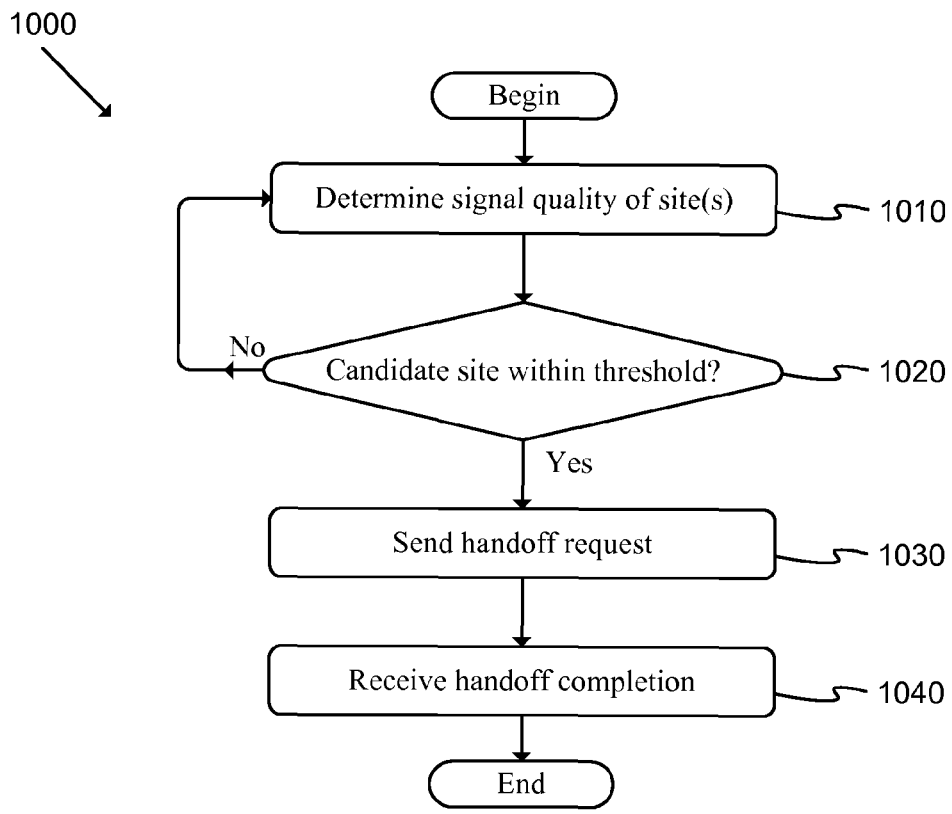
FIG. 10A illustrates a flow chart of a conceptual process used by some embodiments to carry out handoff of the aerial platform from a first serving cell site to a second handoff candidate cell site.

FIG. 10A illustrates a flow chart of a conceptual process 1000 used by some embodiments to carry out handoff of the aerial platform from a first serving cell site to a second handoff candidate cell site. Serving cell site refers to the cell site with which the aerial platform is currently communicating. Such a process may be executed by an aerial platform of some embodiments.

As shown, the process may determine (at 1010) a signal quality for each of the available sites. In some embodiments, the aerial platform radio sub-system may measure beacon signals of neighboring cell sites. The process may then determine (at 1020) whether the beacon signal strength of a candidate cell site is within a threshold of the signal strength of the beacon signal of the serving cell site. If the process determines that the strength of the candidate signal is not within the threshold, the process may repeat operations 1010-1020 until the process determines that the signal strength of the candidate site is within a threshold of the serving site signal strength.

Next, the process may send (at 1030) a handoff request message from the aerial platform to the southern cell site radio sub-system of the serving cell site. The process may then receive (at 1040) a handoff completion message from the northern cell site including the time handoff will take effect and then the process may end.

Figure 10B:
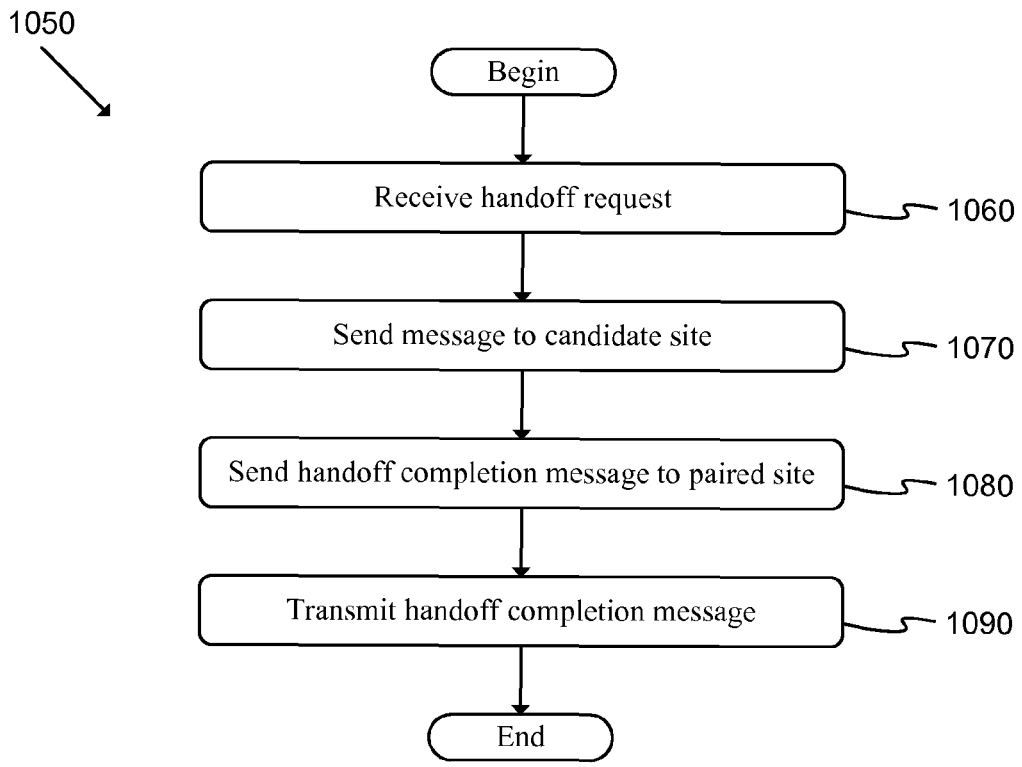
FIG. 10B illustrates a flow chart of a conceptual process used by some embodiments to carry out handoff of the aerial platform from a first serving cell site to a second handoff candidate cell site.

FIG. 10B illustrates a flow chart of a conceptual process 1050 used by some embodiments to carry out handoff of the aerial platform from a first serving cell site to a second handoff candidate cell site. Such a process may be executed by the active and candidate cell sites.

As shown, the process may receive (at 1060), at the southern site radio sub-system, a handoff request message from the aerial platform. Next, the process may send (at 1070) a message to the candidate site from the active site indicating the intent to handoff and a handoff time. The process may then send (at 1080), from the southern site to the paired northern site, a handoff completion message. The northern cell site may then transmit (at 1090) the handoff completion message, including the time handoff will take effect, to the aerial platform.

The above description included techniques to protect the satellite terminal receivers from interference from signals sent on the FSS and DBS downlink spectrum by the secondary service to aerial platforms. Some embodiments also allow use of both the downlink spectrum of FSS bands as well as the uplink spectrum of the FSS bands. As mentioned above, the FSS bands of interest are the C, Ku and Ka bands. In order to protect the primary satellite receivers from any signals transmitted by the secondary service on the uplink FSS spectrum, the secondary service transmitters must limit their emissions into the geo-arc (or other group of satellites) below a certain threshold so as not to exceed a certain ROT into the satellite receivers. Secondary service cell site transmitters located on the northern hemisphere, when transmitting on the FSS uplink frequency band, must primarily transmit to the aerial platforms to their north and avoid transmitting to the south where the geo-arc is located. Moreover, the aerial platform antennas must limit their transmissions into the geo-arc below a certain threshold.

Figure 11:
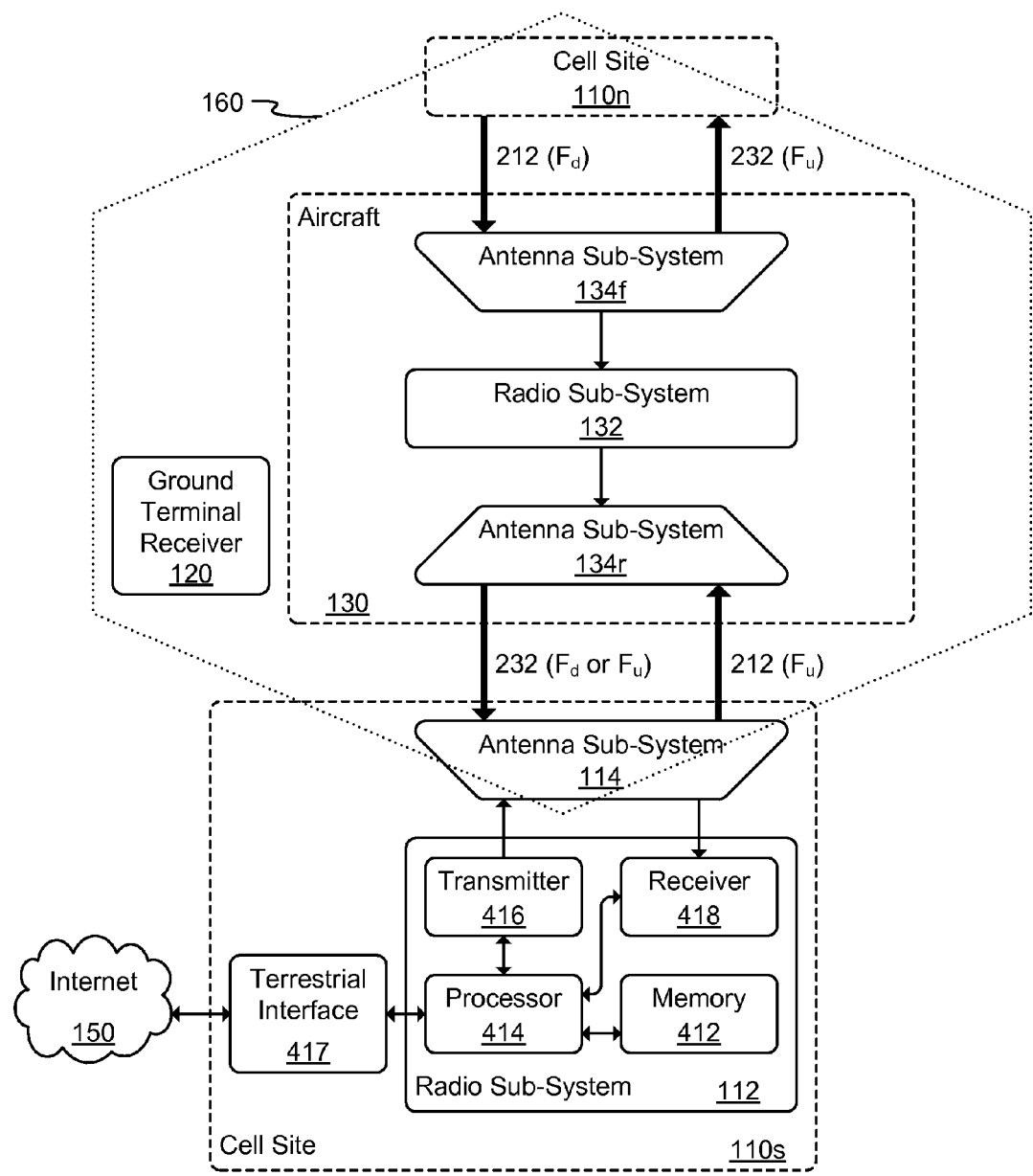
FIG. 11 illustrates a schematic block diagram of a system adapted to provide broadband access to aerial platform using both the downlink and uplink of FSS frequency bands.

FIG. 11 illustrates a schematic block diagram of a broadband access system that uses both downlink FSS spectrum, denoted by $F_d$, and uplink FSS spectrum, denoted by $F_u$. As in the system described by FIG. 2, the transmissions using the FSS downlink frequency $F_d$ are limited from north to south to avoid transmitting into the main beam of the satellite terminals. As shown in FIG. 11, the uplink frequency $F_u$ is only used by the cell site 110 to transmit toward the north to the aerial platform in order to avoid interfering with the geo-arc to the south. The aerial platform antenna 134 is shown to transmit using the uplink frequency $F_u$ in both the northern and southern directions because the aerial platform antenna transmits its signals toward the ground and away from the geo-arc. Moreover, because the cell site antennas are assumed to have high gain, the cell site receiver may receive a high enough signal even if the aerial platform transmitter is limiting its transmit power to a low level to maintain its emission into the geo-arc below a certain threshold.

Note that as shown in FIG. 11, since the southern and northern radio sub-systems 112 are both transmitting and receiving to/from the aerial platform, then it is possible to provide connectivity to the aerial platforms by only having cell site equipment at either the lower or upper corner of each coverage area 160, thereby reducing the complexity of each cell site. However, the benefit of having radio sub-system equipment at both the lower and upper corners of the area is that it allows the area to be larger. Note that as described in reference to FIG. 2 above, the cell site radio sub-system at the upper (northern) corner of the system may have only a radio transmitter and the radio sub-system at the lower (southern) corner of the cell site may have only a radio receiver. In the system shown in FIG. 11, which uses both the FSS uplink and downlink frequencies, $F_u$ and $F_d$, then the radio sub-systems at the lower and upper corner of the coverage area must each have a radio transmitter and a radio receiver.

The detailed description above used the example of a broadband access system deployed in the northern hemisphere. One of ordinary skill in the art will recognize that all systems and methods described above may also apply to a system deployed in the southern hemisphere by reversing the direction of transmissions described in reference to the northern hemisphere implementation.

Figure 12:
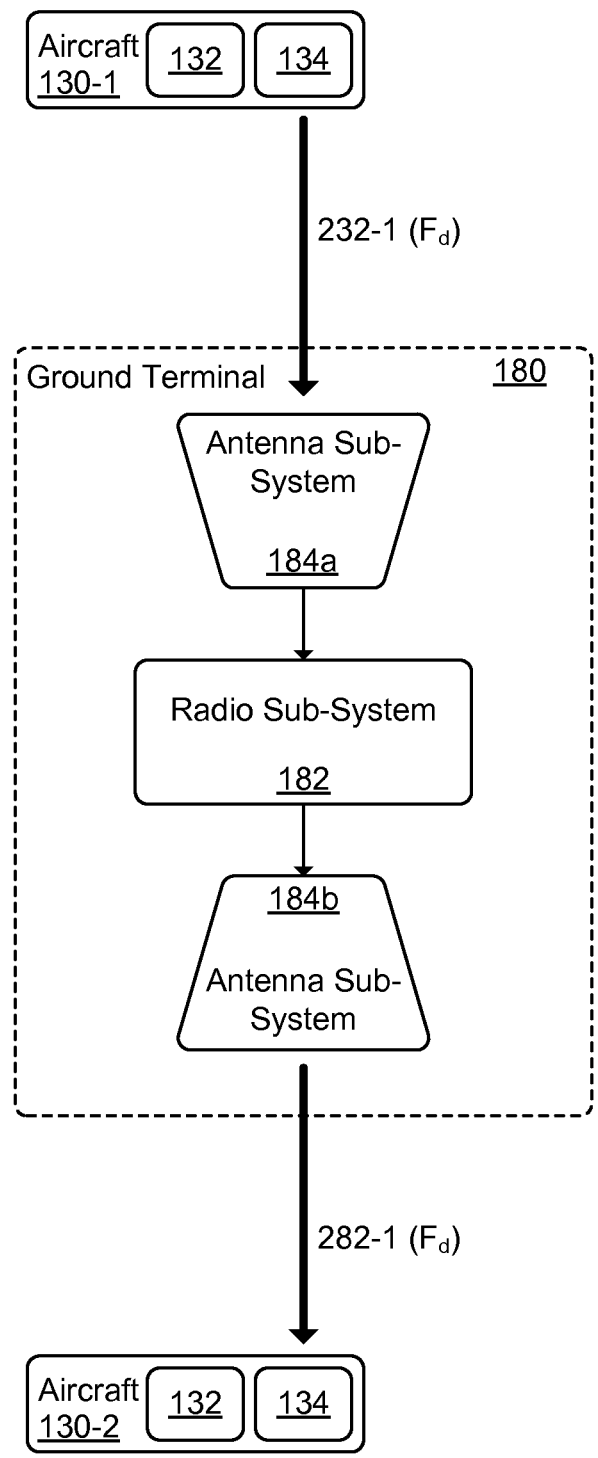
FIG. 12 illustrates a schematic block diagram of a system adapted to provide broadband access to ground terminals via aerial platforms.

Some embodiments may provide broadband Internet access to ground terminals using aerial platforms such as drones or UAVs. FIG. 12 shows a block diagram of a system providing broadband access to ground terminal 180 via aerial platforms 130 using the downlink FSS spectrum without interfering with the incumbent satellite terminal receivers. Note that FIG. 12 shows the block diagram connecting the aerial platforms and the ground terminals. The details of the system for connecting the aerial platforms to the Internet were described in detail above. In order to avoid interfering with satellite terminal receivers, all transmissions on the downlink FSS spectrum are from north to south for terminals deployed in the northern hemisphere. Aerial platform 130-1 may send messages 232-1 to the ground terminal 180, and the ground terminal may send messages 282 to the aerial platform 130-2 to its south. The two aerial platforms 130-1 and 130-2 are themselves connected to the Internet using the systems and methods described previously in this disclosure, and complete the connectivity between the ground terminal 180 and the Internet.

The interference received at the satellite terminal from the ground terminal transmitter is given by equation (3) below:

$$\text{Interference (dBW)} = \text{Ground\_Terminal\_PA\_Power (dBW)} + \quad (3)$$
$$\text{Ground\_Terminal\_Antenna\_Gain\_Toward\_Satellite\_Terminal(dB)} -$$
$$\text{Path\_Loss\_dB} - \text{House\_Penetration\_Loss (dB)} +$$
$$\text{Satellite\_Receiver\_Antenna\_Backlobe\_Gain (dB)} -$$
$$\text{Processing\_Gain (dB)}.$$

As in the case of a cell site antenna, the ground terminal antenna is also designed to have high roll off toward the satellite terminal receivers. All terms in equation (3) are similar to that of equation (1). However, since the ground terminal installed on a house may be very close, say within tens of meters, to a satellite terminal receiver, then an additional measure may need to be taken to further reduce interference from the ground terminal into the satellite terminal receiver. The last term on the right hand side of equation (3), Processing Gain (dB), refers to the ratio of the bandwidth over which the transmit signal is spread to the data rate. Therefore, one technique to reduce the interference is to spread the data over a wider bandwidth, thereby reducing the power spectral density and the ROT. Note that if the data is spread over a wider bandwidth to reduce interference, then the bandwidth efficiency of the system may decrease due to using a larger amount of bandwidth than is normally needed when using spectrum as primary user. To improve the bandwidth efficiency, one may allow multiple uplink ground terminal transmitters to transmit simultaneously on the same bandwidth in a code division multiple access (CDMA) scheme. In the CDMA scheme, multiple ground terminals transmit on the same bandwidth simultaneously but by modulating the data of different terminals using different codes so that the receiver at the aerial platform may separate the data received from different ground terminals.

Figure 13:
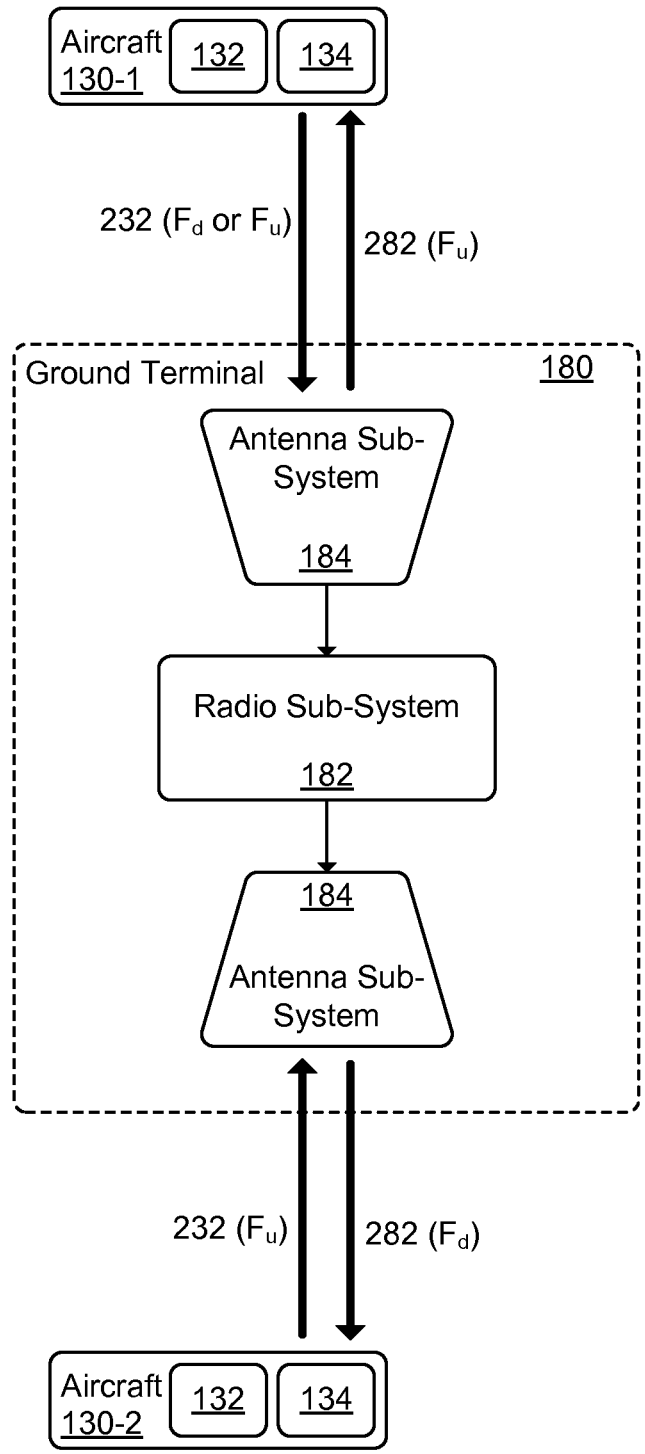
FIG. 13 illustrates a schematic block diagram of a system that provides broadband access to a ground terminal via multiple aerial platforms using both the downlink and uplink frequencies of the FSS bands.
Figure 14:
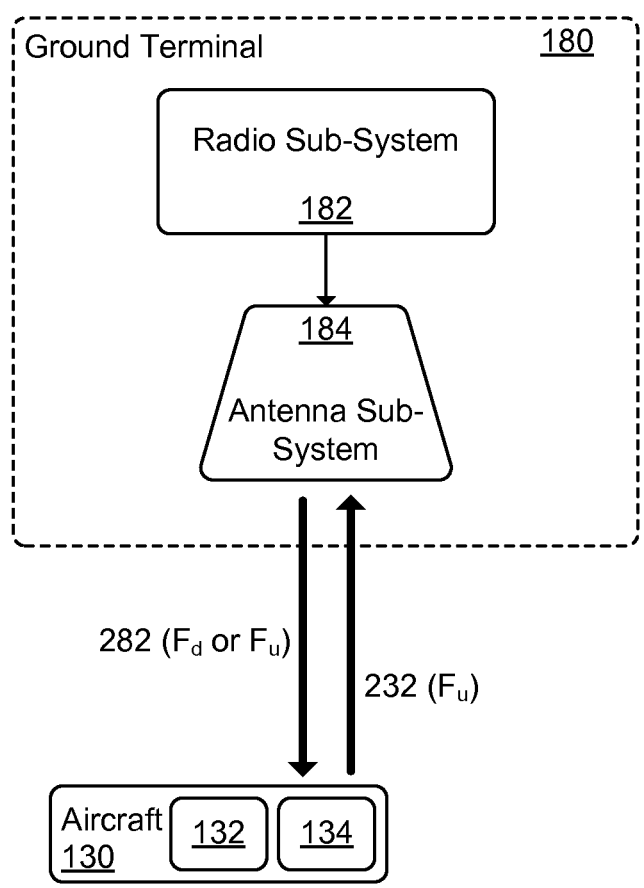
FIG. 14 illustrates a schematic block diagram of a system that provides broadband access to a ground terminal via a single aerial platforms using both the downlink and uplink frequencies of the FSS bands.

FIG. 13 shows the block diagram of a system that provides broadband access to ground terminal 180 via aerial platforms 130-1 and 130-2 using both the downlink and uplink frequencies of the FSS bands. As shown in FIG. 4, the ground terminal has a bidirectional link to both aerial platforms. The ground terminal transmits on the uplink frequency $F_u$ only to the aerial platform to its north. The aerial platform to the north of the ground terminal may transmit to the ground terminal using the uplink or downlink frequencies. Because both aerial platforms have a bidirectional link to the ground terminal, it is also possible to have the ground terminal communicate via only one aerial platform as shown in FIG. 14.

Many of the processes and modules described above may be implemented as software processes that are specified as one or more sets of instructions recorded on a non-transitory storage medium. When these instructions are executed by one or more computational element(s) (e.g., microprocessors, microcontrollers, Digital Signal Processors (DSPs), Application-Specific ICs (ASICs), Field Programmable Gate Arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 15:
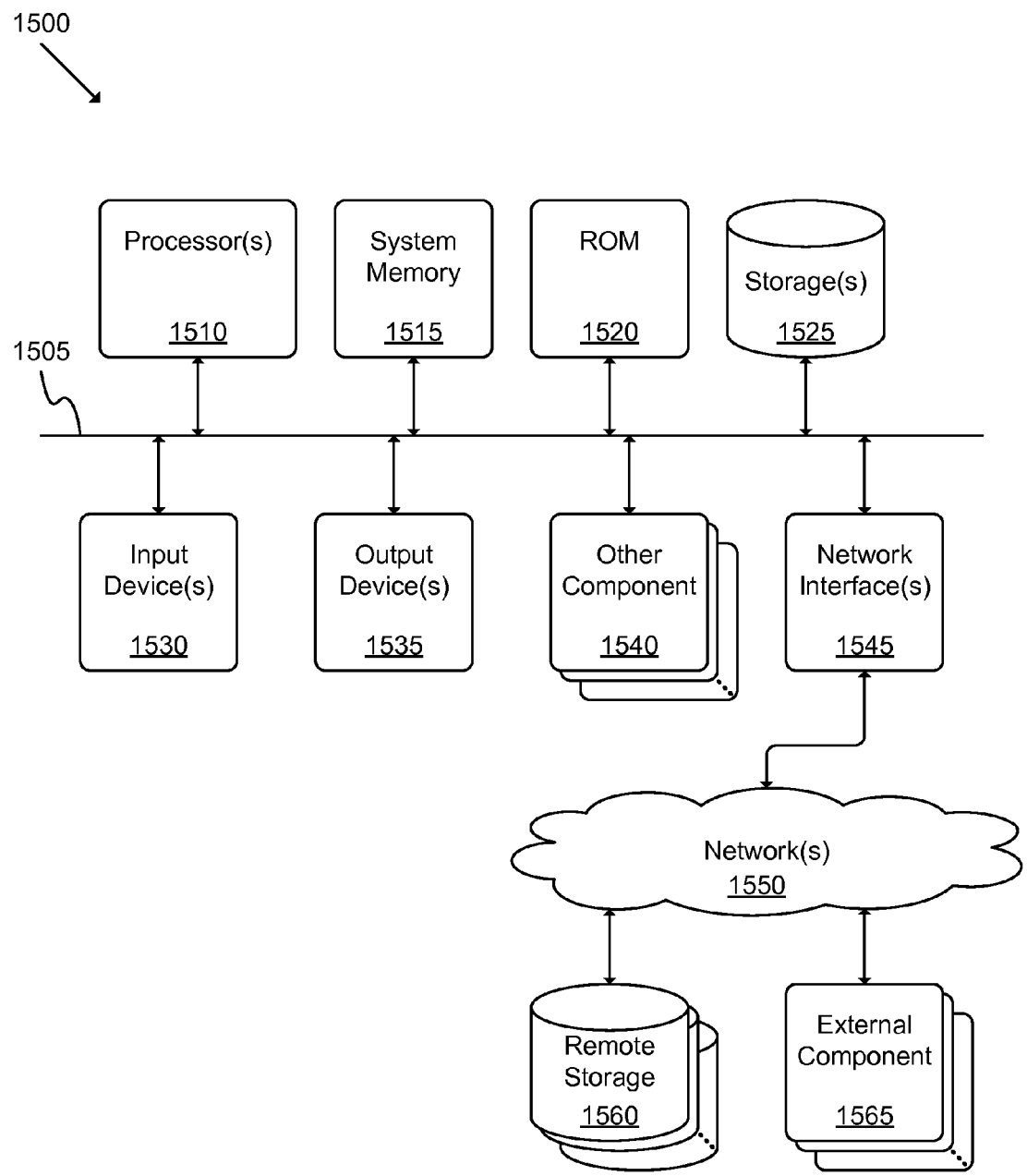
FIG. 15 conceptually illustrates a schematic block diagram of a computer system with which some embodiments of the invention may be implemented.

FIG. 15 illustrates a schematic block diagram of a conceptual computer system 1500 used to implement some embodiments of the invention. For example, the systems described above in reference to FIGS. 1, 2, and 4 may be at least partially implemented using computer system 1500. As another example, the processes described in reference to FIGS. 7A-8B, 10A and 10B may be at least partially implemented using sets of instructions that are executed using computer system 1500.

Computer system 1500 may be implemented using various appropriate devices. For instance, the computer system may be implemented using one or more personal computers ("PC"), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1500 may include at least one communication bus 1505, one or more processors 1510, a system memory 1515, a read-only memory (ROM) 1520, permanent storage devices 1525, input devices 1530, output devices 1535, various other components 1540 (e.g., a graphics processing unit), and one or more network interfaces 1545.

Bus 1505 represents all communication pathways among the elements of computer system 1500. Such pathways may include wired, wireless, optical, and/or other appropriate communication pathways. For example, input devices 1530 and/or output devices 1535 may be coupled to the system 1500 using a wireless connection protocol or system.

The processor 1510 may, in order to execute the processes of some embodiments, retrieve instructions to execute and/or data to process from components such as system memory 1515, ROM 1520, and permanent storage device 1525. Such instructions and data may be passed over bus 1505.

System memory 1515 may be a volatile read-and-write memory, such as a random access memory (RAM). The system memory may store some of the instructions and data that the processor uses at runtime. The sets of instructions and/or data used to implement some embodiments may be stored in the system memory 1515, the permanent storage device 1525, and/or the read-only memory 1520. ROM 1520 may store static data and instructions that may be used by processor 1510 and/or other elements of the computer system.

Permanent storage device 1525 may be a read-and-write memory device. The permanent storage device may be a non-volatile memory unit that stores instructions and data even when computer system 1500 is off or unpowered. Computer system 1500 may use a removable storage device and/or a remote storage device 1560 as the permanent storage device.

Input devices 1530 may enable a user to communicate information to the computer system and/or manipulate various operations of the system. The input devices may include keyboards, cursor control devices, audio input devices and/or video input devices. Output devices 1535 may include printers, displays, and/or audio devices. Some or all of the input and/or output devices may be wirelessly or optically connected to the computer system.

Other components 1540 may perform various other functions. These functions may include performing specific functions (e.g., graphics processing, sound processing, etc.), providing storage, interfacing with external systems or components, etc.

Finally, as shown in FIG. 15, computer system 1500 may be coupled to one or more networks 1550 through one or more network interfaces 1545. For example, computer system 1500 may be coupled to a web server on the Internet such that a web browser executing on computer system 1500 may interact with the web server as a user interacts with an interface that operates in the web browser. Computer system 1500 may be able to access one or more remote storages 1560 and one or more external components 1565 through the network interface 1545 and network 1550. The network interface(s) 1545 may include one or more application programming interfaces (APIs) that may allow the computer system 1500 to access remote systems and/or storages and also may allow remote systems and/or storages to access computer system 1500 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1500 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments of the invention and modifications may be made without departing from the spirit and scope of the invention as defined by the following claims.

I claim:

1. A system that provides broadband access to aerial platforms, the system comprising:
    an aerial platform comprising a radio sub-system that communicates using a single fixed satellite service (FSS) downlink frequency band from among a set of available bands and an antenna tuned to one or more bands from the set of available bands; and
    a plurality of cell sites that communicate with the aerial platform using the single FSS downlink frequency band, each cell site including:
        a coverage area comprising at least a first corner and a second corner, wherein the coverage area is a geographic area that provides bidirectional communication between the aerial platform and at least one of the plurality of cell sites;

a wireless radio transmitter at a transmitting sub-site located at the first corner that transmits to the radio sub-system of the aerial platform using the single FSS downlink frequency band; and a wireless radio receiver at a receiving sub-site located at the second corner that receives transmissions sent by the radio sub-system of the platform using the single FSS downlink frequency band, wherein downlink messages are received at the aerial platform from the transmitting site and uplink messages are sent from the aerial platform to the transmitting site via the receiving site.

2. The system of claim 1, wherein all wireless radio transmissions between the aerial platform and the cell sites are broadcast in a particular geographic direction, wherein the particular geographic direction is south when the system is located in the northern hemisphere and the particular geographic direction is north when the system is located in the southern hemisphere.

3. The system of claim 1 further comprising a terrestrial network adapted to communicatively couple cell site equipment located at the first corner of the coverage area to cell site equipment location at the second corner of the coverage area and cell site equipment associated with a first site from among the plurality of cell sites to cell site equipment associated with at least a second site from among the plurality of cell sites, wherein the wireless radio transmitter is adapted to send signaling messages to the aerial platform on the single FSS downlink frequency band and the wireless radio receiver is adapted to receive signaling messages from the aerial platform on the single FSS downlink frequency band and forward the signaling messages to the cell site equipment located at the first corner of the cell site, wherein the signaling messages comprise at least one of a beacon, association, registration, handoff, bandwidth request, and data packets.

4. The system of claim 1, wherein a transmit antenna associated with the aerial platform is adapted to reduce a gain associated with the transmit antenna based at least partly on a distance from the aerial platform to the cell site in order to hold nearly constant a sum of the gain and a path loss.

5. The system of claim 1, wherein a transmit antenna associated with the cell site is adapted to reduce a gain associated with the transmit antenna based at least partly on a distance from the cell site to the aerial platform in order to hold nearly constant a sum of the gain and a path loss.

6. The system of claim 1 further comprising at least one ground terminal comprising:

a receiver adapted to receive signals from the aerial platform on the single FSS downlink frequency band;

a transmitter adapted to send signals to the aerial platform; and at least one antenna fixture pointed toward the aerial platform.

7. The system of claim 6, wherein a first antenna fixture of the ground terminal is aimed toward a first aerial platform and a second antenna fixture of the ground terminal is aimed toward a second aerial platform and the ground terminal transmits to the first aerial platform and receives from the second aerial platform.

* * * * *